(12) United States Patent
Carney

(10) Patent No.: US 10,898,014 B1
(45) Date of Patent: Jan. 26, 2021

(54) PLANT TREE

(71) Applicant: Raymond M Carney, Mobile, AL (US)

(72) Inventor: Raymond M Carney, Mobile, AL (US)

(*) Notice: Subject to any disclaimer, the term of this patent is extended or adjusted under 35 U.S.C. 154(b) by 0 days.

(21) Appl. No.: 16/814,586

(22) Filed: Mar. 10, 2020

Related U.S. Application Data

(60) Provisional application No. 62/977,206, filed on Feb. 15, 2020.

(51) Int. Cl.
- *A47G 7/04* (2006.01)
- *F16M 13/02* (2006.01)
- *A47F 7/00* (2006.01)

(52) U.S. Cl.
CPC ............ *A47G 7/042* (2013.01); *F16M 13/02* (2013.01); *A47F 7/0078* (2013.01)

(58) Field of Classification Search
CPC .......... A47G 7/04; A47G 7/041; A47G 7/042; A47G 7/045; A47F 7/0078
See application file for complete search history.

(56) References Cited

U.S. PATENT DOCUMENTS

| | | | | |
|---|---|---|---|---|
| 708,666 A | * | 9/1902 | Rodriguez | A47G 7/045 248/290.1 |
| 2,919,878 A | * | 1/1960 | Walter | A47F 5/04 248/158 |
| 4,770,303 A | * | 9/1988 | Boyd | A47G 7/042 211/118 |
| 4,991,344 A | * | 2/1991 | Carney | A47G 7/042 211/133.2 |
| 8,955,808 B2 | * | 2/2015 | Buschbach | F16M 13/02 248/214 |
| 10,016,077 B1 | * | 7/2018 | Carney | F16M 13/02 |
| 2012/0240458 A1 | * | 9/2012 | Ganske | A01G 27/005 47/39 |

* cited by examiner

*Primary Examiner* — Magdalena Topolski
*Assistant Examiner* — William L Gmoser
(74) *Attorney, Agent, or Firm* — George L Williamson

(57) ABSTRACT

Method and apparatus for an upright standing plant tree for supporting plants including potted plants, feeding plants, flower pots or the like and having a plurality of post sections which are adapted to be connected to each other so as to form a height adjustable center post support. Also shown are a plurality of triangular shaped legs which can be removably attached to the center post by using an upper longer cylindrical bracket and a lower, shorter cylindrical bracket so that the legs can be attached to the plant tree by being removably connected to each of the cylindrical brackets. Each of the cylindrical brackets has a plurality of side by side receptacles being integrally formed into the cylindrical brackets so that a plurality of radially extending arms can be connected to the cylindrical brackets using the receptacles. Also shown are the plurality of radially extending arms which can be connected so that the arms can be either extended upwardly or extended downwardly using set screws so that the downwardly extending arms do not fall out of their corresponding receptacle.

16 Claims, 4 Drawing Sheets

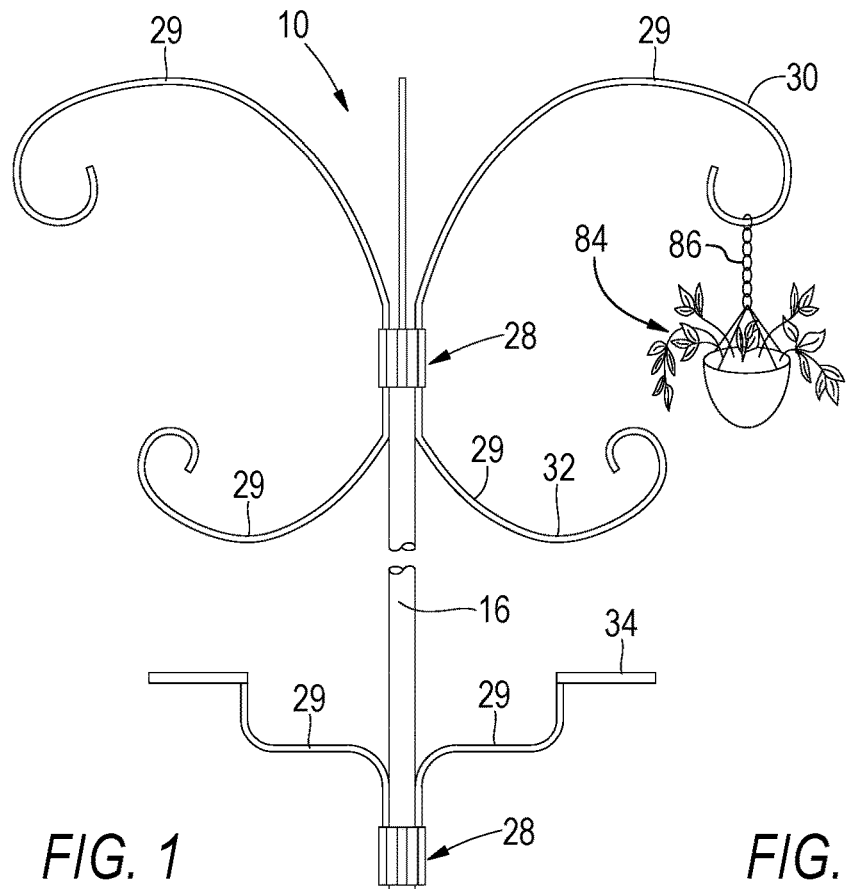
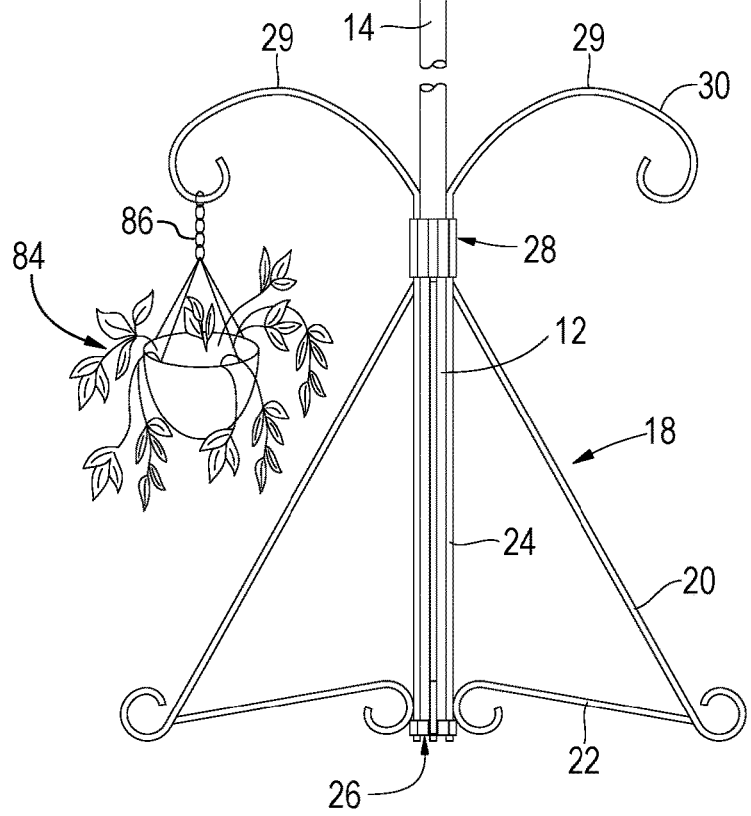
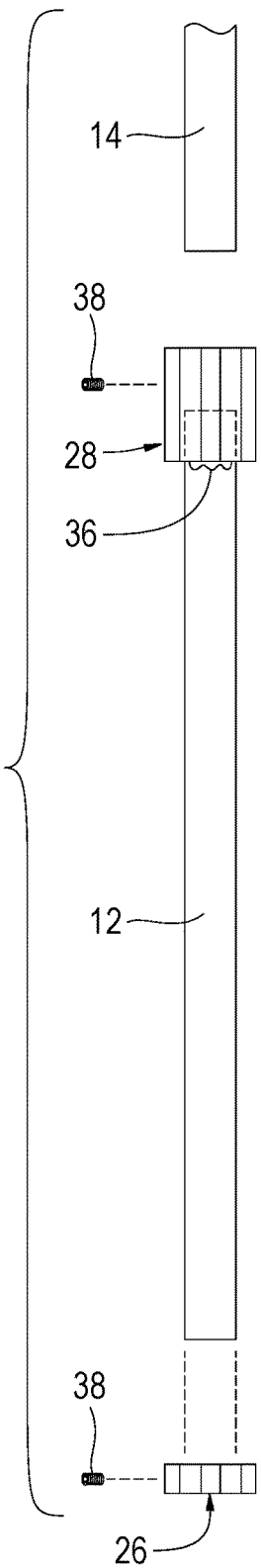
FIG. 1
FIG. 2

PLANT TREE

RELATED APPLICATIONS

This application claims benefit to U.S. Provisional Patent Application No. 62/977,206 dated Feb. 15, 2020.

BACKGROUND OF THE INVENTION

Field of the Invention

The present invention relates generally to devices for holding flower pots, plants, and the like, and more particularly, is concerned with a plant tree designed to hold flower pots, plants and the like.

Description of the Related Art

Devices relevant to the present invention have been described in the related art; however, none of the related art devices disclose the unique features of the present invention.

In U.S. Pat. No. 4,991,344, dated Feb. 12, 1991, Carney disclosed an apparatus for holding plants, pots, or the like. In U.S. Pat. No. 10,016,077, dated Jul. 10, 2018, Carney disclosed a bracket for wall mounting.

While these devices may be suitable for the purposes for which they were designed, they would not be as suitable for the purposes of the present invention as hereinafter described. As will be shown by way of explanation and drawings, the present invention works in a novel manner and differently from the related art.

SUMMARY OF THE PRESENT INVENTION

The present invention discloses an upright standing plant tree for supporting plants including potted plants, feeding plants, flower pots or the like and having a plurality of post sections which are adapted to be connected to each other so as to form a height adjustable center post support. Also shown are a plurality of triangular shaped legs which can be removably attached to the center post by using an upper longer cylindrical bracket and a lower, shorter cylindrical bracket so that the legs can be attached to the plant tree by being removably connected to each of the cylindrical brackets. Each of the cylindrical brackets has a plurality of side by side receptacles being integrally formed into the cylindrical brackets so that a plurality of radially extending arms can be connected to the cylindrical brackets using the receptacles. Also shown are the plurality of radially extending arms which can be connected so that the arms can be either extended upwardly or extended downwardly using set screws so that the downwardly extending arms do not fall out of their corresponding receptacle.

An object of the present invention is to provide a plant tree upon which a plurality of flower pots, plants, or the like can be supported. A further object of the present invention is to provide a plant tree which is height adjustable and portable so that it can be positioned in a variety of locations. A further object of the present invention is to provide a plant tree for supporting either upwardly or downwardly radially extending arms. A further object of the present invention is to provide a plant tree to which a plurality of triangular shaped legs can be attached so that they are removably connected to a center post of the plant tree. A further object of the present invention is to provide a plant tree which can be easily operated by a user. A further object of the present invention is to provide a plant tree which can be easily and relatively inexpensively manufactured and can be made into a single unit by using a plurality of set screws.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which:

In order that the invention may be more fully understood, it will now be described, by way of example, with reference to the accompanying drawings in which:

FIG. 1 is a side elevation view of the present invention shown in operative connection.

FIG. 2 is a side elevation view of the base post/trunk of the present invention.

LIST OF REFERENCE NUMERALS

Figure 3:
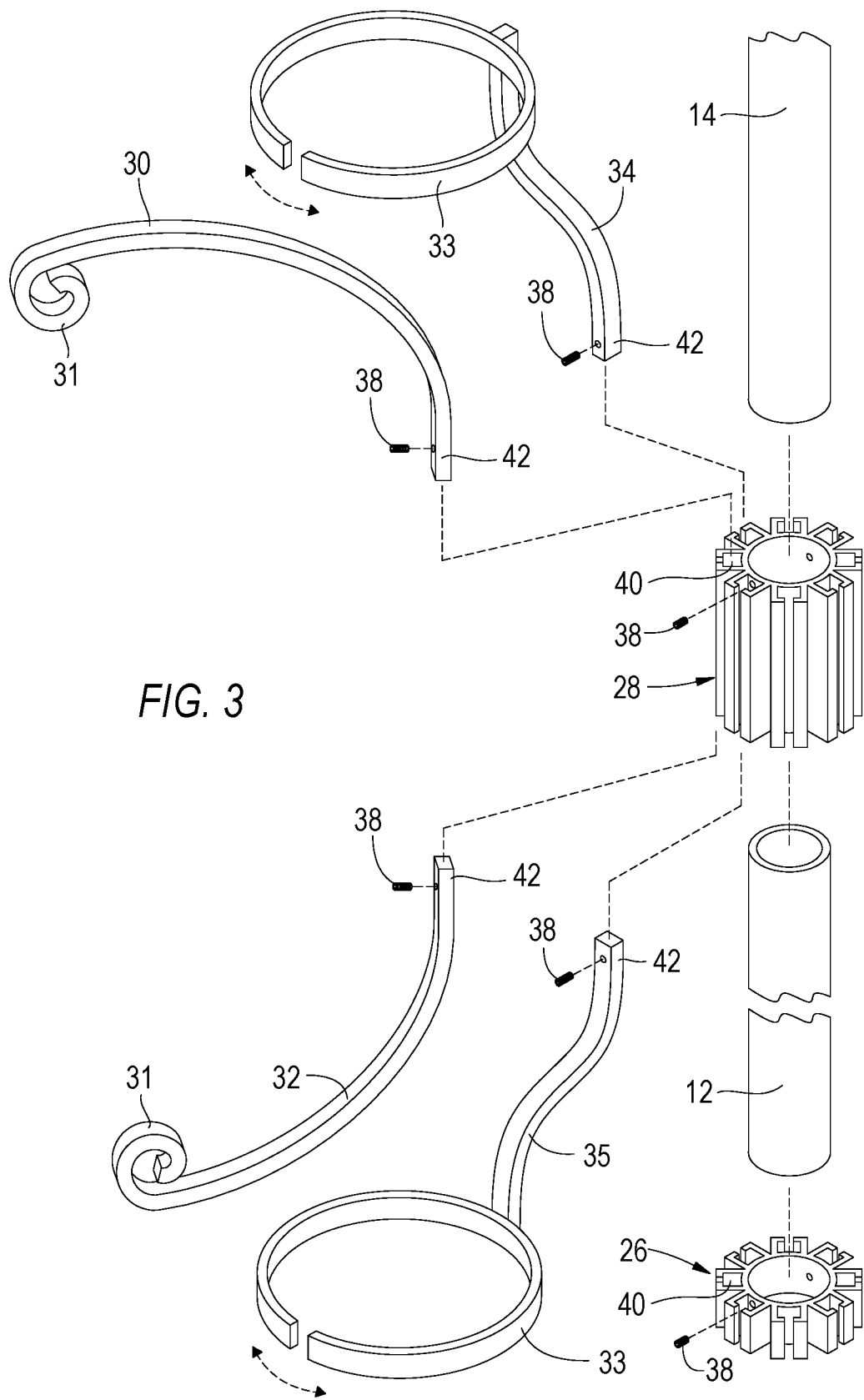
FIG. 3 is a perspective view of portions of the present invention.

With regard to reference numerals used, the following numbering is used throughout the drawings.

10 present invention
12 base post/trunk
14 center post/trunk
16 upper post/trunk
18 leg
20 outer leg support member
22 floor leg support member
24 upright leg support member
26 short cylindrical bracket
28 large cylindrical bracket
29 radially extending limb/arm
30 upwardly extending hanging limb
31 curled end 32 downwardly extending hanging limb
33 circular ring
34 upwardly extending potted limb
35 downwardly extending potted limb
36 weld
38 set screw
40 receptacle
41 opening/space
42 base end of limb
44 hole
46 upper end of upright leg support member
48 lower end of upright leg support member
50 inner bore
52 apertures
54 exemplary limb member
55 exemplary leg member
56 exemplary post/trunk
58 deck mount
60 base
62 receiver
64 bolt
66 nut
68 aperture
70 hole
72 ceiling mount
74 ground mount
76 ground
78 corner
80 structure
82 wall
84 plant
86 chain

DETAILED DESCRIPTION OF THE PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 11 illustrate the present invention wherein a modular plant tree is disclosed and which is generally indicated by reference number 10.

Turning to FIG. 1, therein is shown the present invention 10 which is a plant tree, generally shown by reference numeral 10, having three sections including a base post/trunk 12, a center post/trunk 14, and an upper post/trunk 16 all of which are hollow and supported in an upright position by a plurality of legs 18 spaced apart around the base post/trunk 12 and resting on a support surface. Also shown is a leg 18 having an outer leg support member 20, a floor leg support member 22, and an upright leg support member 24. The upright leg support member 24 is held contiguous to the base post/trunk 12 by using a shorter, smaller cylindrical bracket 26 near the floor and a larger, longer cylindrical bracket 28 on an upper end of the base post/trunk 12. A plurality of large cylindrical brackets 28 are used so that a single large cylindrical bracket 28 is mounted onto the upper end of each section including the base, the center, and upper post/trunk 12 14, 16. When the plant tree 10 is in its upright position as shown in FIG. 1, the sections of the post/trunk 12,14,16 can support a plurality of limbs/arms, generally indicated by reference numeral 29, extending radially therefrom including a plurality of upwardly extending hanging limbs 30 for having flower pots 84 hung from them using chains 86, a plurality of downwardly extending hanging limbs 32, a plurality of upwardly extending potted limbs 34, and a plurality of downwardly extending potted limbs 35 (see FIG. 2) for having flower pots placed inside them.

Turning to FIG. 2, therein is shown the base post/trunk 12 having a short cylindrical bracket 26 on its lower end for resting on a support surface which bracket is attached by a set screw 38 along with a large cylindrical bracket 28 on its upper end which is attached to the post/trunk 12 using a weld 36. Also shown is another set screw 38 which is used to removably secure the lower end of the center post/trunk 14 into the large cylindrical bracket 28 as was shown in FIG. 1.

Turning to FIG. 3, therein is shown the base post/trunk 12 having a shorter cylindrical bracket 26 at its lower end and a larger, longer cylindrical bracket 28 at its upper end as previously described along with the center post/trunk 14 and showing a plurality of set screws 38. The short cylindrical bracket 26 and the large cylindrical bracket 28 each have a plurality of receptacles 40 spaced apart around the outer circumference of the cylindrical bracket which forms a receptacle 40 for receiving the base 42 of the upwardly extending hanging limbs 30 and potted limb 34 along with the downwardly extending hanging limb 32 and downwardly extending potted limb 35. A set screw 38 is used to removably secure the base end 42 of each of the hanging limbs 30 and potted limbs 34 into a receptacle 40 which will be described in more detail later.

Figure 4:
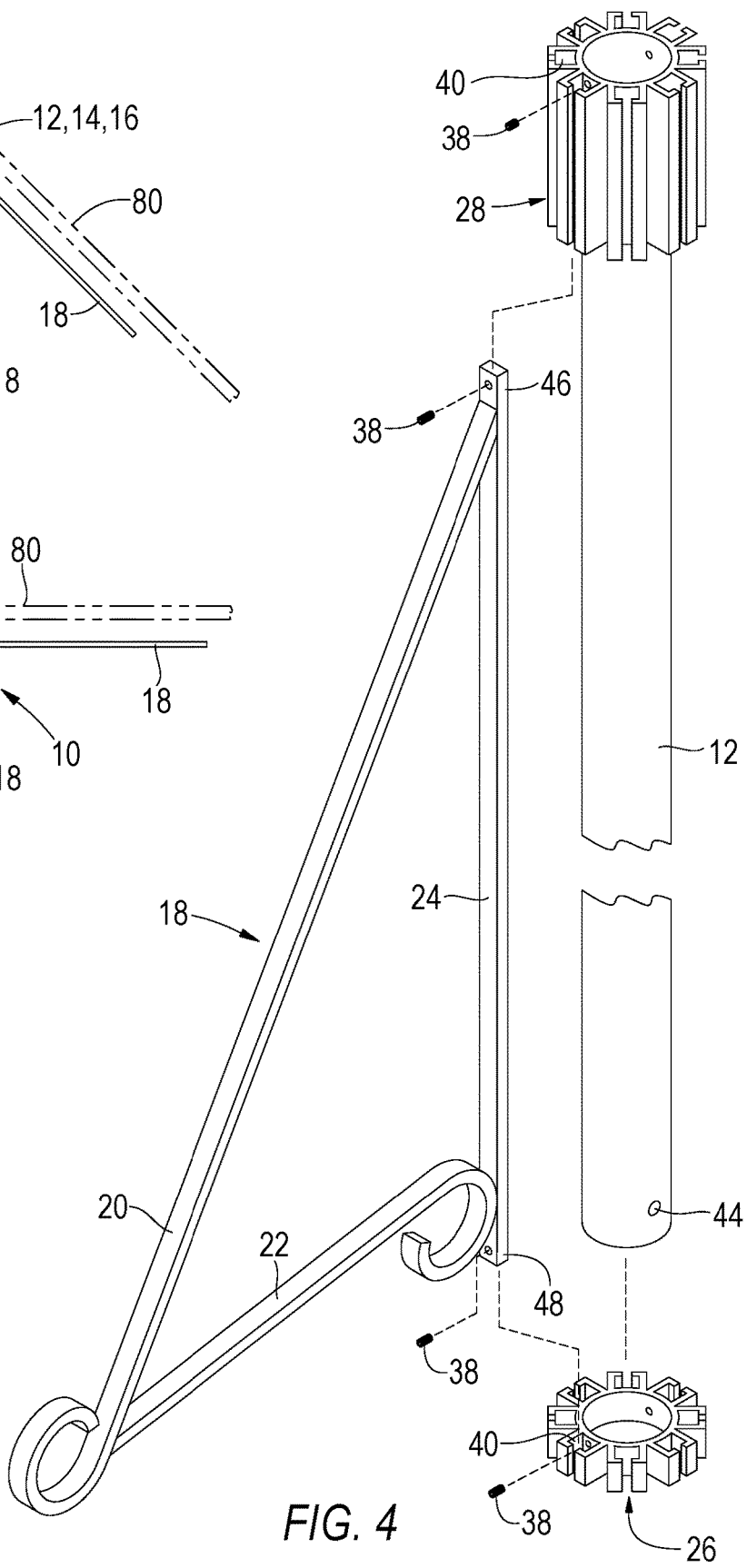
FIG. 4 is a partially exploded view of the base post/trunk and leg of the present invention.
Figure 7:
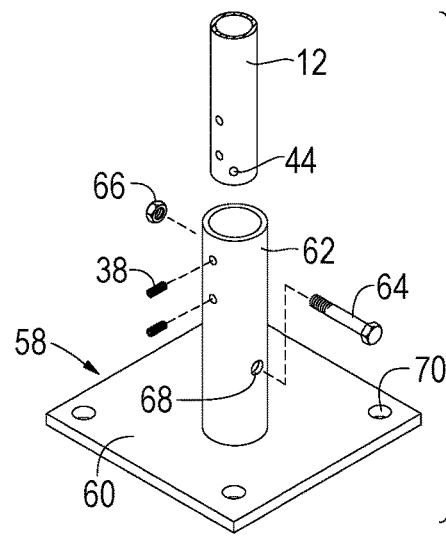
FIG. 7 is a perspective view of a deck mount of the present invention.
Figure 8:
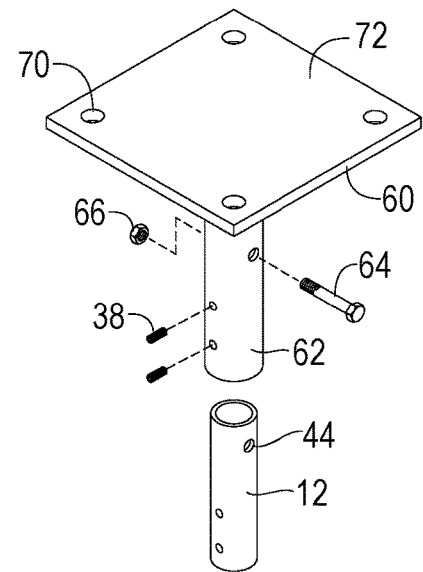
FIG. 8 is a perspective view of a ceiling mount of the present invention.

Turning to FIG. 4, therein is shown the base post/trunk 12 having a slidable short cylindrical bracket 26 at its lower end and a large cylindrical bracket 28 at its upper end along with the set screws 38 which has been previously disclosed. Cylindrical brackets 26, 28 are built to have the same dimensions except for their height. The lower end of the base post/trunk 12 has a hole 44 therein for receiving a bolt which is shown in FIGS. 7 and 8 and will be described later. The support leg 18 is shown having the outer leg support member 20 which is disposed at about a 30-75 degree angle with the horizontal, the floor leg support member 22, and the straight upright leg support member 24 wherein the upright leg support member has an upper end 46, and a lower end 48 which are very important to the operation of the present invention 10 in that the upper end of the upright leg support member 46 is inserted into a lower end of receptacle 40 of the large cylindrical bracket 28 and the lower end of the upright leg support member 48 is inserted into an upper end of receptacle 40 on the short cylindrical bracket 26 and each of the upper and lower ends 46, 48 are secured to their corresponding cylindrical bracket using a set screw 38 so as to allow the legs 18 to be attached to the base post/trunk 12. The base post/trunk 12 is slightly longer than post/trunks 14,16 to match the length of the legs 18 in order to provide additional upright support to the present invention 10. This method of assembly allows the legs 18 to be easily movably but fixedly attached to the post/trunk 12 of the present invention 10 at various circular angles relative to each other which allows the plurality of legs to be used in a user selectable and customized environment so as to allow a user of the present invention 10 to adapt the present invention into a variety of settings (see FIGS. 10 and 11 for two examples). The receptacles 40 of the smaller and larger cylinders 26, 28 are vertically aligned with each other when seen in a top view so that the legs 18 are precisely upright and perpendicular to the floor or like support surface and the upright leg support member 24 is parallel to the post/trunk 12 so that they have a parallel central axis. The outer leg support member 20 extends from an outer end of floor leg support member 22 to a top end of the upright leg support member 24 to provide added support strength and a luxurious appearance. A bottom view of the shorter bracket 26 as seen in FIG. 4 would look similar to FIG. 6 wherein the ends of the upright leg support member 24 would be seen in four receptacles 40.

Figure 5:
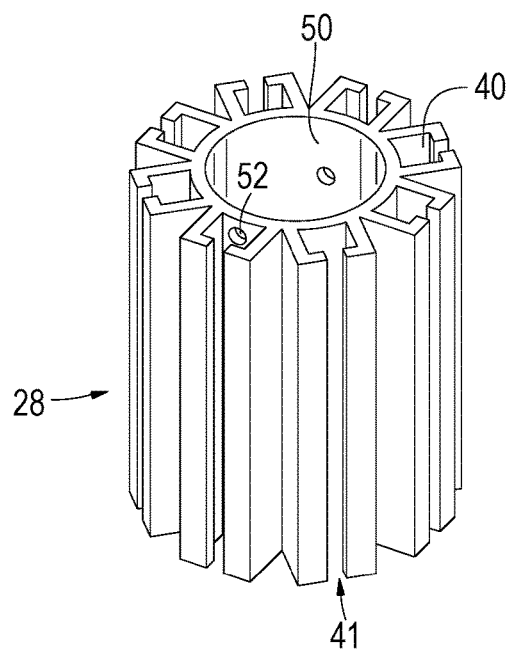
FIG. 5 is a perspective view of a large cylindrical bracket of the present invention.

Turning to FIG. 5, therein is shown a large cylindrical bracket 28 having a plurality of receptacles 40 formed around it so as to expose its inner bore 50 which allows for a post/trunk to be placed therein. Also shown are apertures 52 for receiving set screws as previously disclosed. An opening 41 is shown on the front of each square/rectangular receptacle 40 which opening extends from a top to a bottom of each cylinder 28.

Figure 6:
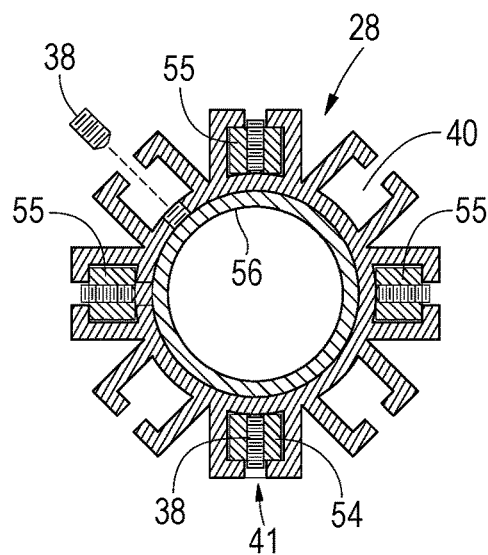
FIG. 6 is a cross sectional view of a large cylindrical bracket of the present invention.

Turning to FIG. 6, therein is shown a large cylindrical bracket 28 along with a plurality of receptacles 40 along with a plurality of set screws 38 and an exemplary limb member 54 having its set screw 38 in opening 41 and passing entirely through the limb so as to contact the outer surface of the circular wall of the large cylindrical bracket 28. Exemplary leg members 55 are also shown disposed in various receptacles. Also shown is the wall of the immediately preceding above upper post/trunk 56 as has been previously shown in FIG. 1. When seen in a top view as shown in FIG. 6, the small cylinder 26 looks the same as the large cylinder 28. Also, FIG. 6 shows a view similar to what would be seen in a bottom view of the short cylindrical bracket having exemplary legs 55 attached thereto showing the lower end of the upright leg support member disposed in a receptacle 40 of the short cylindrical bracket.

Turning to FIG. 7, therein is shown a deck mount 58 having a base 60 thereon wherein the base can be attached to an upper surface of an outdoor deck or the like to allow the present invention 10 to be installed onto the deck of a home or other structure along with a receiver 62 having an aperture 68 therein for receiving a bolt 64 and nut 66 so that the base post/trunk 12 can be attached to the deck mount by using the nut and bolt 64, 66 as would be done in the standard manner by one skilled in the art. Also shown are a pair of set screws 38 and holes 70 wherein the set screws are used to tighten the post/trunk 12 into the receiver 62 and the holes 70 and are used to attach the deck mount onto the deck using a plurality of lag bolts or other fasteners as would be done in the standard manner by one skilled in the art. Also shown is hole 44 for receiving a bolt 64.

Turning to FIG. 8, therein is shown a ceiling mount 72 which is formed by taking a deck mount 58 and turning it upside down so that the base 60 can be attached to a ceiling as would be done in the standard manner by one skilled in the art. The ceiling mount 72 has the same elements as the deck mount 58 except that everything is turned upside down. Also shown is hole 44 for receiving a bolt 64.

Figure 9:
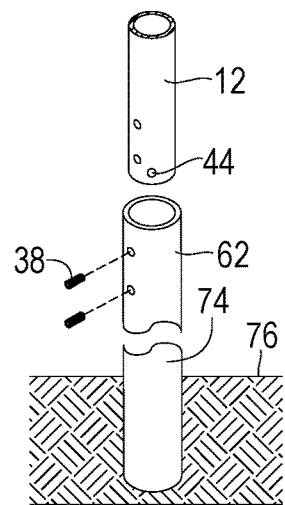
FIG. 9 is a perspective view of an in-ground mount of the present invention.

Turning to FIG. 9, therein is shown a ground mount 74 for being mounted into the ground 76 simply by sticking the ground mount 74 into the ground or by mounting it into a body of concrete so that it can be more permanently mounted into the ground. The ground mount 74 has a receiver portion 62 for receiving the base post/trunk 12 of the present invention 10 and a pair of set screws 38 used to tighten the post/trunk 12 into the ground mount receiver. Also shown is hole 44 for receiving a bolt.

Figure 10:
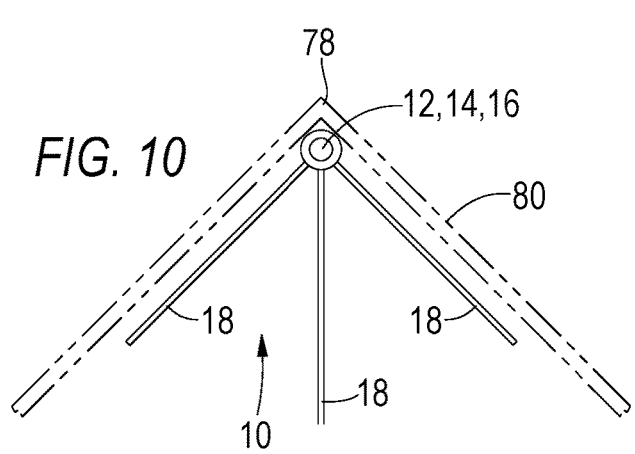
FIG. 10 is an illustration of the present invention disposed in a corner of a structure.

Turning to FIG. 10, therein is shown the present invention 10 mounted into a 90 degree corner 78 which corner would be a corner of a room or other structure 80 wherein the present invention 10 has the legs 18 mounted in three adjacent receptacles 40 of its cylindrical brackets 26, 28 so that the post/trunk 12, 14, 16 can be situated contiguous to the inside surface of the corner 78 of the structure 80 and wherein the legs are confined within a 90 degree circular angular distance/arc when viewed from the top.

Figure 11:
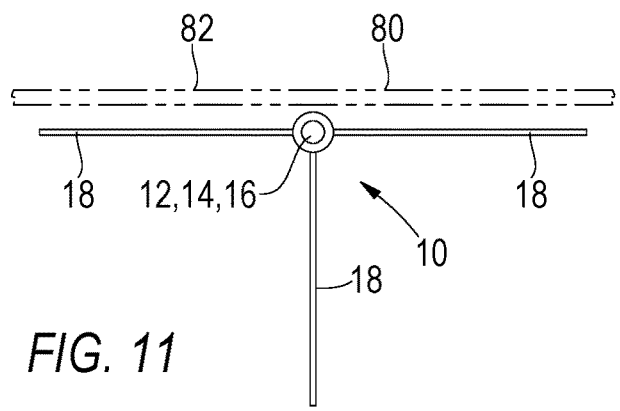
FIG. 11 is an illustration of the present invention disposed against a wall of a structure.

Turning to FIG. 11, therein is shown the present invention 10 with legs 18 removed on one side so that its post/trunk 12, 14, 16 can be placed against a wall 82 of a structure 80 so that it is flush against the wall. The legs 18 are spaced about the post/trunk so as to support the present invention in an upright position against the wall 82 by simply removing the leg on one side of the present invention 10 toward or against the wall.

The following provides more details of the present invention 10 and FIGS. 1-11 and the cylinder/bracket 26,28 which has a plurality of receptacles or sockets 40. Shown are a plurality of limbs or arms 29 wherein some arms are of a type with a curled end 31 therein upon which pots 84 with plants can be hung using chains 86 with hooks or the like along with at least one type arm with a circular ring 33 for receiving a pot therein which pot can contain flowers which rings can be adjusted in diameter by squeezing the ends of the ring together or by spreading them apart to increase the diameter. Also shown in FIG. 3 are a plurality of set screws 38 for use in attaching the base 42 of the limbs into the receptacles 40 so as to secure the radially extending limb or arm 29 into its respective receptacle 40. It can be seen that each set screw 38 goes through an aperture which is expected to be threaded. The bases 42 may be placed in the receptacles 40 from above or below the receptacles and held in place by the set screws 38. Turning to FIG. 5, therein is shown the bracket 28 showing an opening 41 on the front of each square-shaped socket or receptacle 40 which is provided to allow the set screw 38 to pass through the opening to be screwed into the radially extending limbs/arms 29 so as to attach the limb securely in the receptacle of the present invention 10. A set screw 38 is shown being a hex socket set screw (allen screw) not having a head thereon. The set screws 38 are provided so that if the limbs 29 are placed into the sockets 40 from the bottom they will not fall out when bumped. Conventional plant trees have allowed for limbs to be placed in the bottoms of their sockets from below so that a cantilever effect caused by gravity held the limbs in place, however, if the limbs were bumped the limbs could fall out of the sockets due to their weight pulling them downwardly which is a major disadvantage of the prior art. However, the present invention 10 overcomes this problem by securing the limbs 29 inside the receptacles 40 by using a set screw 38 thereby preventing the limbs from falling out of the receptacles in any situation. Note that opening 41 is sized and shaped to receive the threaded portion of the set screw 38 therein while, optionally, the outer surface also provides a rest for the head portion of the fasteners. The set screw 38 can extend completely through the limb 29 so that the screw tip bears against the surface/wall of the cylinder 28 so as to secure the limb inside the receptacle 40.

The present invention 10 has a cylinder/bracket 26, 28 having a plurality of integrally formed side-by-side receptacles 40 formed in a circular portion, the receptacles being capable of receiving the bases 42 of radially extending arms 29. Also shown are openings 41 on the receptacles, wherein the openings are vertically disposed on a front of the bracket; also, configuring the radially extending arms 29 to receive set screws 38 or the like for securing the arms in the receptacles. Also, passing the set screws through the openings and into the radially extending arms. Also, extending the receptacles from the top to the bottom of the receptacles and wherein the receptacles are square/rectangular shaped. Also shown are a number of spaced pairs of parallel walls extending radially outward from an outer surface of the cylinder 28 forming a plurality of integrally formed receptacles 40 between each wall of the parallel walls on the cylinder portion, the receptacles for receiving limbs 29, wherein each pair of parallel walls having inwardly directed portions extending from distal ends thereof to define opposing L-shaped walls, forming a space/opening 41 between distal ends of each pair of inwardly directed flange portions to partially enclose a limb in each of the receptacles.

The following provides instructions for using the present invention 10: 1) Lay out your pieces and find the included tool being an allen wrench. The marked area on each cylinder 28 is to help indicate the location of the set screw 38 which allows you to line up the set screws on your tree 10. 2) Find the trunk 12 with the removable cylinder 26 attached to it and another trunk. Line up the set screws 38 and connect the two trunks together by sliding the shorter trunk into the large cylinder 38 located at the top of each trunk. Once both trunks are secured, remove the attached cylinder from the bottom trunk (set aside for Step 4). 3) Flip the two assembled trunks upside down so the cylinders are at the bottom. Gather the legs 18 and slide them into the highest cylinder, placing a leg in every other slot. It is best to line up the set screws which will place the arms right over the legs which balances the plant tree and provides extra strength to support the plants. Normally try to avoid placing a leg in a receptacle which has a set screw present. 4) Locate the cylinder 26 from Step 2. Holding the legs in place, position the cylinder over the trunk and legs so the set screw is not covered by a leg. Slide the cylinder down, securing the legs in place. Once all the way down on the trunk, tighten the set screw to secure it in place. 5) Flip the assembly upright, and tighten the set screws on the legs. This will help secure your Plant Tree from having swaying on uneven surfaces. If you are assembling your Plant Tree in the Half-Height Assembly, skip to Step 7. 6) Locate the final trunk. Lining up the set screws, slide the trunk into the top of the assembly and tighten the set screw to secure the trunk to the rest of the Plant Tree. 7) Add your Hanging Limbs 30 and Potted Limbs 34 to the Plant Tree to best suit your needs. If you add any limbs to hang from the bottom of the cylinder, be sure to tighten the set screw so the limb and plant do not fall out. 8) Add your plants 84.

The present invention 10 is expected to be constructed of architectural aluminum which is lightweight and quite strong and can hold very heavy plants. However, the present invention 10 could be made of many other type materials.

I claim:

1. A plant tree for supporting plants, comprising:
   (a) a center post having a plurality of post sections releasably connected to each other;
   (b) a base post section having a longer cylindrical bracket on an upper end thereof and a shorter cylindrical bracket on a lower end thereof, each said cylindrical bracket being of single piece construction and completely surrounding post sections and having a plurality of integrally formed side by side receptacles each having a rectangular shaped cross section, each said receptacle extending from a top to a bottom of said cylindrical bracket, wherein each said receptacle receives a base of a radially extending arm, wherein said receptacles of said longer cylindrical bracket and said shorter cylindrical bracket are vertically aligned with each other, said longer cylindrical bracket overlapping and joining an adjacent post and base post sections;
   (c) a plurality of legs attached to said shorter cylindrical bracket on said lower end of said base post section of said center post, said legs extending laterally from said base post section for supporting the plant tree in an upright position;
   (d) each said leg having an upright support member parallel to an outer surface of said base post section, wherein said upright support member is straight, wherein an upper end of said upright support member is disposed in a lower end of said receptacle of said longer cylindrical bracket and a lower end of said upright support member is disposed in an upper end of said receptacle of said shorter cylindrical bracket to permit said leg to be movably fixed to said base post section; wherein each said leg has the upright support member, an outer leg support member, and a floor support member, wherein said outer leg support member is disposed at an angle; wherein each said leg is substantially right triangle shaped when viewed from a side;
   (e) arms radially extending from said receptacles of both said brackets for supporting said plants; and
   (f) wherein said base post section is perpendicular to a support surface.

2. The plant tree of claim 1, wherein each said receptacle has an opening therein, wherein said opening is vertically disposed on a front of said receptacle wherein said openings extend from said top to said bottom of said receptacle.

3. The plant tree of claim 2, further comprising a set screw for securing said base of said radially extending arm in said receptacle.

4. The plant tree of claim 3, wherein said set screw passes through said openings into said radially extending arms.

5. The plant free of claim 4, wherein said receptacles are square shaped.

6. The plant tree of claim 4, wherein said receptacle is rectangular shaped.

7. The plant tree of claim 1, wherein said center post is capable of being elongated by placing a lower end of a first said post section into an upper end of said longer cylindrical bracket of a second said post section so as to elongate said center post of the plant tree.

8. The plant tree of claim 1, wherein said outer leg support member is disposed at an angle ranging from 30 degrees to 75 degrees relative to a horizontal plane.

9. A method of assembling a plant tree for supporting plants, comprising the steps of:
   (a) providing a center post having a plurality of post sections connected to each other,
   (b) providing a base post section having a longer cylindrical bracket on an upper end thereof and a shorter cylindrical bracket on a lower end thereof, each cylindrical bracket being of single piece construction and completely surrounding said base post section and having a plurality of integrally formed side by side receptacles each having a rectangular shaped cross section, each receptacle extending from a top to a bottom of each cylindrical bracket, wherein each receptacle is configured for receiving a base of a radially extending arm;
   (c) attaching a plurality of legs to said shorter cylindrical bracket on said lower end of the base post section of the center post so that the legs extend laterally from the base post section for supporting the plant tree in an upright position;

(d) aligning vertically said receptacles of said longer and said shorter cylindrical bracket with each other, said longer cylindrical bracket overlapping and joining adjacent post sections;

(e) forming each leg to include an upright support member parallel to an outer surface of said base post section wherein an upper end of the upright support member is disposed in a lower end of the receptacle of the longer cylindrical bracket and a lower end of the upright support member is disposed in an upper end of the receptacle of the shorter cylindrical bracket to permit the leg to be movably fixed to the base post section; wherein each said leg has the upright support member, an outer leg support member, and a floor support member, wherein said outer leg support member is disposed at an angle; wherein each said leg is substantially right triangle shaped when viewed from a side;

(f) mounting limbs on said receptacles of both said brackets for supporting said plants; and (g) wherein the base post section is perpendicular to a support surface.

10. The method of claim 9, wherein each receptacle has an opening therein, wherein the opening is vertically disposed on a front of the receptacle wherein the opening extends from the top to the bottom of the receptacle.

11. The method of claim 10, further comprising the step of providing a set screw for securing the base of the radially extending arm in the receptacle.

12. The method of claim 11, wherein the set screw passes through the opening into the radially extending arms.

13. The method of claim 12, wherein the receptacles are square shaped.

14. The method of claim 12, wherein the receptacle is rectangular shaped.

15. The method of claim 9, wherein the center post is capable of being elongated by placing a lower end of a first post section into an upper end of the longer cylindrical bracket of a second post section so as to elongate the center post of the plant tree.

16. The method of claim 9, wherein the outer leg support member is disposed at an angle ranging from 30 degrees to 75 degrees relative to a horizontal plane.

* * * * *